United States Patent [19]
Melchior

[11] Patent Number: 6,146,024
[45] Date of Patent: Nov. 14, 2000

[54] CONNECTOR BODY

[75] Inventor: Lutz Melchior, Berlin, Germany

[73] Assignee: Infineon Technologies AG, Munich, Germany

[21] Appl. No.: 09/201,735

[22] Filed: Nov. 30, 1998

[30] Foreign Application Priority Data

Nov. 28, 1997 [DE] Germany .......................... 297 21 776

[51] Int. Cl.[7] .................................................. G02B 6/38
[52] U.S. Cl. ................................ 385/59; 385/60; 385/63; 385/71
[58] Field of Search ................................ 385/59, 60, 63, 385/65, 71, 83

[56] References Cited

U.S. PATENT DOCUMENTS

| | | | |
|---|---|---|---|
| 4,217,030 | 8/1980 | Howarth | 350/96.21 |
| 4,753,515 | 6/1988 | Sato et al. | 350/320 |
| 5,125,057 | 6/1992 | Aberson, Jr. et al. | 385/65 |
| 5,199,093 | 3/1993 | Longhurst | 385/88 |
| 5,452,390 | 9/1995 | Bechtel et al. | 385/60 |
| 5,692,079 | 11/1997 | Iso | 385/59 |

FOREIGN PATENT DOCUMENTS

| | | |
|---|---|---|
| 0458608A1 | 11/1991 | European Pat. Off. . |
| 3216560C2 | 10/1985 | Germany . |

*Primary Examiner*—Frank G. Font
*Assistant Examiner*—Roy M. Punnoose
*Attorney, Agent, or Firm*—Herbert L. Lerner; Laurence A. Greenberg; Werner H. Stemer

[57] ABSTRACT

The optical fiber connector has a connector body formed with receptacles for the ends of optical fibers. The fibers terminate at a coupling end face of the connector body. A plurality of aligning openings, which are accessible at the coupling end face, cooperate with aligning pins on a cooperating plug. The aligning openings are formed with an insertion region that terminates at an edge formed by the intersection of the opening and the coupling end face. The aligning openings widen in such a way that there is no contact between the edge at the coupling end face and the respective aligning pin inserted into the aligning opening.

3 Claims, 2 Drawing Sheets

CONNECTOR BODY

BACKGROUND OF THE INVENTION

Field of the Invention

The invention lies in the field of multi-channel optical connections. Connector bodies—also designated optical endpieces or ferrules—are thereby used for terminating and coupling optical fibers. Within the scope of the present invention, an optical fiber is understood as a conductor that is capable of guiding and transmitting an optical signal, such as optical fiber sets, optical fiber ribbons or optical conductors constructed on a substrate. The connector bodies can be connected to suitable connecting partners with corresponding coupling partners. Consideration can be given as coupling partners to, for example, the ends of similar optical fibers, but also to short optical fiber connecting pieces (so-called pigtails) or electrooptical transducers (for example laser diodes).

The invention pertains to a connector body for the optical connection of a plurality of optical fibers, having receptacles for the ends of the optical fibers, with a coupling end face to which the receptacles lead. A plurality of aligning openings are provided that are accessible at the coupling end face for cooperating aligning means.

Such a connector body is described in U.S. Pat. No. 5,199,093 to Longhurst (European application EP 0 458 608 A1). That prior art connector body is preferably produced by injection molding and has a back into which a ribbon cable comprising a plurality of individual optical fiber ends enters. The individual optical fibers run in a common plane in a parallel fashion up to the front of the connecting body, which is constructed as a coupling end face and is situated opposite to and parallel with the back. The individual coupling end faces of the individual optical fiber ends are accessible at the coupling end face and can be optically coupled to assigned coupling partners. The connector body is provided with continuous through bores running in a parallel fashion on both sides of the optical fibers for the purpose of achieving a reproducible coupling of high quality. The bores have a circular cylindrical configuration and are accessible to cooperating aligning means, for example in the form of cylindrical centering pins from the side of the coupling end face. During a connecting operation with a complementary connector part, the centering pins thereof penetrate into the aligning openigns of the connector body and thereby ensure a relative positioning of the assigned coupling partners.

The aligning openings have a constant cross sectional width, and in the case of a circular cylindrical configuration, a constant diameter over their entire length. They end with a sharp edge at the coupling end face. Particularly in the case of repeated connecting operations—that is to say a plurality of plug-in cycles—the comparatively hard centering pins can damage the sensitive edge contours of the aligning openings. The abrasion particles produced in the process usually adhere to the centering pin, and are stripped off by the latter during the further connecting operation. As a result, the abrasion residue is undesirably deposited between the coupling end faces, which are to be brought into contact, of the connector bodies to be connected. It is also possible for further pollutants adhering to the centering pins to be deposited in this way. Substantial impairment of the optical coupling (worsening of the coupling efficiency) can result from this. Consequently, it is necessary to subject the prior art connector body to thorough cleaning of its coupling end face after a few plug-in cycles.

SUMMARY OF THE INVENTION

It is accordingly an object of the invention to provide an optical connector body, which overcomes the above-mentioned disadvantages of the heretofore-known devices and methods of this general type and whose aligning openings are protected against damage during the connecting operation, and in which pollutants on the coupling end face because of abrasion caused by connecting operations is avoided.

With the foregoing and other objects in view there is provided, in accordance with the invention, a connector for a plurality of optical fibers, comprising:

- a connector body having a plurality of receptacles formed therein each for receiving an end of an optical fiber;
- a coupling end face formed on the connector body at which the receptacles terminate;
- the connector body being formed with a plurality of aligning openings for receiving therein cooperating aligning means at the coupling end face;
- the aligning openings having an insertion region terminating with an edge at the coupling end face, the aligning openings widening towards the edge at the coupling end face such that no contact is formed between the edge and an aligning means inserted into the aligning opening.

In other words, the objects of the invention are satisfied with the optical connector body that is formed with alignment openings that have widening insertion regions reaching as far as the coupling end face. That is, the aligning openings widen in such a way that there is no contact between the edge, on the coupling end face side, of the insertion region and an aligning means inserted into the aligning opening.

Within the scope of the present invention, the terms aligning means and aligning elements are to be understood to encompass all components which, in a way familiar to those of still in the art, facilitate the mutual positioning with corresponding geometries of the coupling partner. Bodies with elongated geometries, for example cylindrical pins, pins or rods with a polygonal cross section or bolts prove, in particular, to be suitable aligning elements for this purpose. Consequently, the term aligning opening designates a material cutout or bore which is tuned or adapted in terms of its shape and width to the respective aligning element and which can receive the aligning element without play for the purpose of centering.

Thus, while the aligning openings continue to be configured and dimensioned to hold the cooperating aligning means without play, and thus to effect a precise mutual alignment of the coupling partners, the widening of the aligning openings towards the coupling end face advantageously forms a reservoir for the possible holding of any small particles which may occur and are to be stripped off. These particles therefore no Longer come between the coupling partners. The abrasion which is virtually unavoidable, particularly in the case of material pairings of a brittle connector body material and a hard material of the aligning means, is greatly reduced by the widened part in the insertion region. The preferred funnel-shape configuration further simplifies plugging the two parts together.

In accordance with an added feature of the invention, the insertion region is formed with a circular cylindrical segment terminating at the coupling end face. This embodiment of the novel connector body is preferred in terms of production engineering. The circular cylindrical section reaching as far as the coupling end face. This permits satisfactory removal of material in the case of finishing the coupling end face, for example, to polish the optical fiber end faces.

In accordance with a concomitant feature of the invention, the aligning openings widen conically towards the coupling end face. This feature is particularly advantageous if the connector body is constructed as an injection molded part.

Other features which are considered as characteristic for the invention are set forth in the appended claims.

Although the invention is illustrated and described herein as embodied in a connector body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
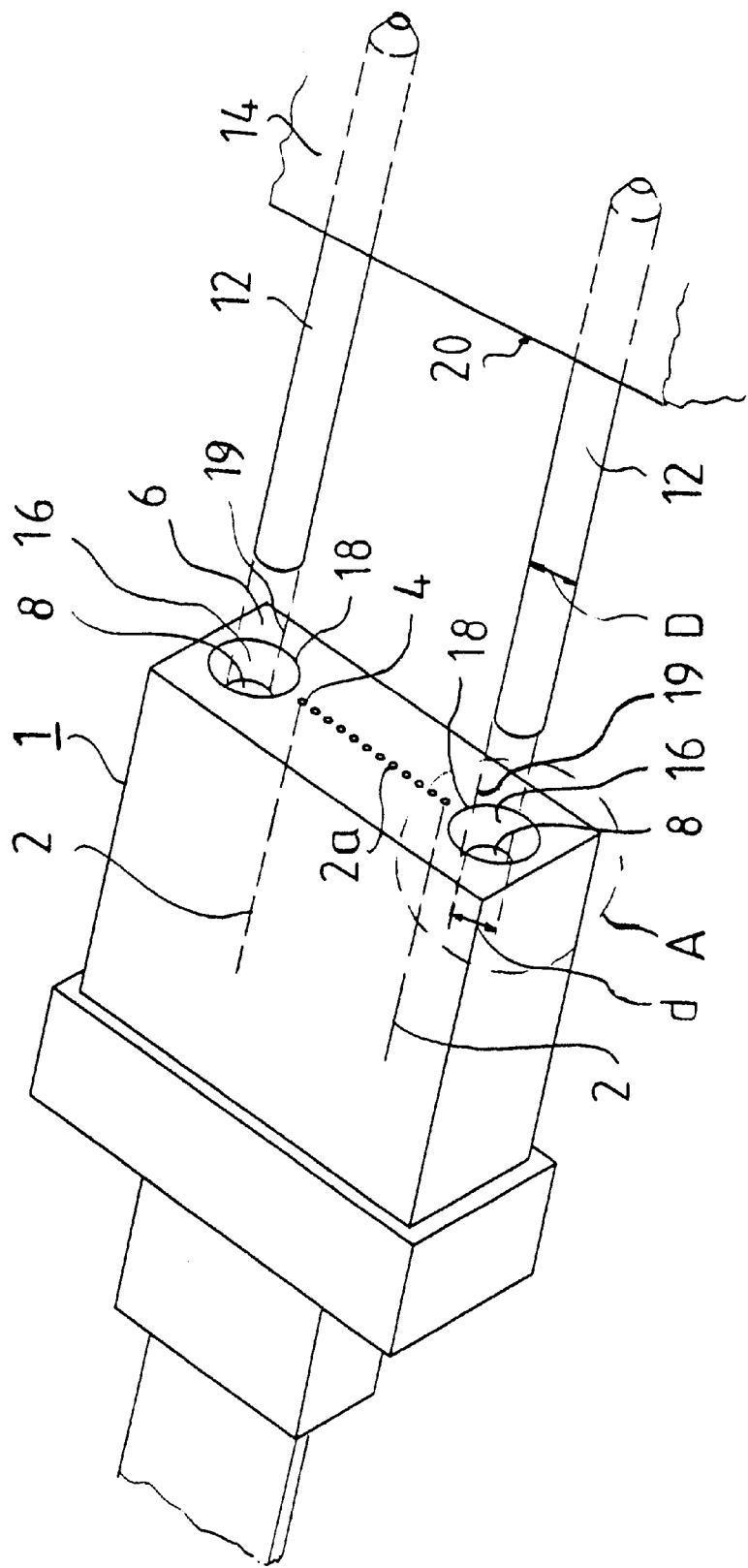
FIG. 1 is a perspective view of a connector body according to the invention.

Referring now to the figures of the drawing in detail and first, particularly, to FIG. 1 thereof, there is seen a connector body 1 for the terminal connection of a plurality of optical fiber ends 2. The optical fiber ends 2 run in receptacles 4 which can be formed, for example, by parallel bores that are aligned in a common plane. The receptacles 4 lead to a coupling end face 6 (front) of the connector body 1, with the result that optical fiber ends 2 introduced into the receptacles 4 end in common at the coupling end face 6 with their coupling end faces 2a. The fiber ends 2 (i.e. the end faces 2a) can preferably be finished, for example polished, in common with the coupling end face 6. A plurality of aligning openings 8 are worked into the connector body 1. The aligning openings 8, here, are two essentially cylindrical bores. The aligning openings 8 are arranged on both sides of and parallel to the optical fiber ends. The longitudinal axes of the bores 8 lie in a common plane with the optical fiber ends 2. Cylindrical pins 12 form aligning means 12 that cooperate with the aligning openings 8. The pins 12 form a part of a diagrammatically indicated connecting partner 14. The connecting partner 14 may be formed as a coupling plug as it is described in the above-noted U.S. Pat. No. 5,199,093, and that is adapted to form an appropriate connection with the plurality of optical fiber ends.

In general terms, the width or the cross section of the respective aligning opening 8 is tuned to the width or the cross section of the respective cooperating aligning means 12 in such a way that during the connecting operation the aligning means 12 are held in the aligning openings 8 in a precise fashion. It is thereby necessary to ensure a proper fit, without play, in order to produce high-quality mutual alignment of the participating coupling partners. In the exemplary embodiment, because of the exemplary circular cylindrical construction of the aligning means or the aligning openings, inside diameters d of the aligning openings are of the same dimension as outside diameters D of the centering pins 12.

The aligning openings 8 widen towards the coupling end face 6 like a funnel or a conical frustum. Consequently, an insertion region 16 is formed which is situated in the plug-in direction ahead of the actual aligning openings serving the purpose of alignment and centering, and reaches as far as the coupling end face 6. The result of this is that given an existing connection between the connector bodies 1 and 14, there is no physical contact between the edge 18, at the side of the coupling end face, of the insertion region 16 and the corresponding centering pin 12 inserted into the respective aligning opening 8. This position 19 of the centering pins 12 is represented by dashes in FIG. 1 in an extension of the fronts of the centering pins.

The advantageous result of this is that upon the insertion of the aligning pins 12 in the aligning openings 8, pollutants or abrasion particles possibly adhering to the pins 12 are not stripped off until the transition between the insertion region 16 and the aligning openings 8, and thus do not come between the end face 6 and the opposite end face 20 of the connecting partner 14. They cannot, therefore, impair the coupling efficiency. A further advantage consists in that the insertion region 16 serves as a threading aid, and the edges 18 are protected against being directly struck by the end faces of the aligning means 12. Damage to the sensitive and brittle edge 18 when abrasion particles are formed is thereby avoided to the greatest possible extent.

Figure 2:
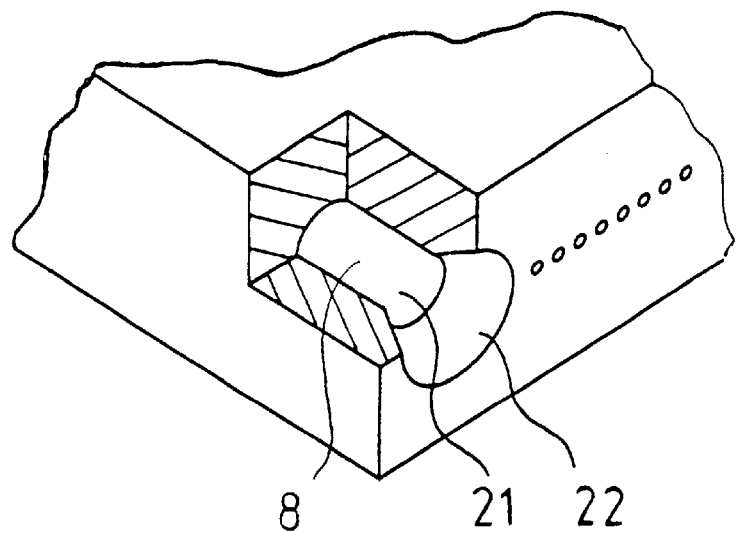
FIG. 2 is a partial perspective view of the detail A in FIG. 1, showing a first variant of the invention.

With reference to FIG. 2, there is shown the construction of the aligning opening 8 and of the insertion region 16 in accordance with the detail A of FIG. 1. During the insertion operation, particles that may possibly adhere to the aligning pins 12 are stripped off not at the edge 18 - which makes no physical contact with the aligning pins - but at most at the edge 21 formed by the transition of the insertion region 16 to the aligning opening 8. The insertion region 16 in this case forms an adequate reservoir 22 for holding such particles. The coupling end face 6 thereby remains unimpaired and free from particles.

Figure 3:
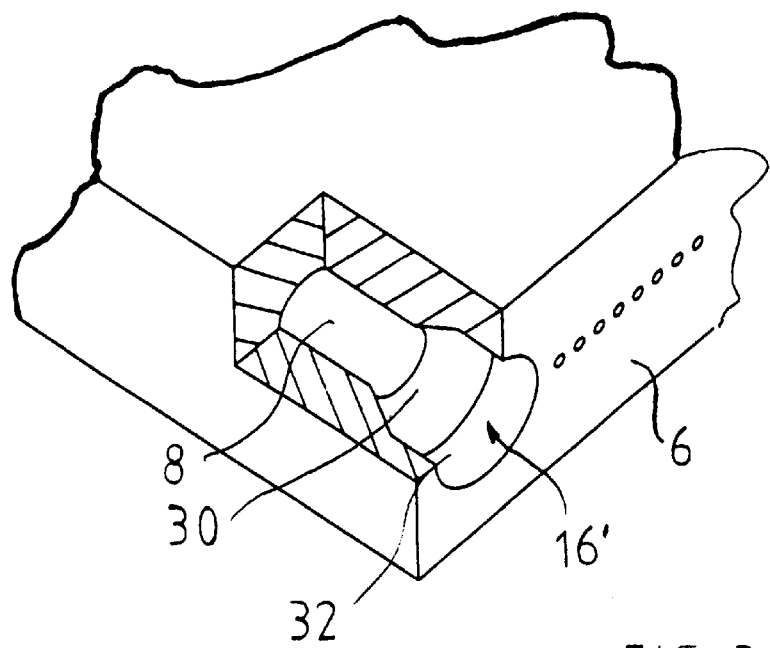
FIG. 3 is a partial perspective view of the detail A in FIG. 1, showing a second variant of the invention.

With reference to FIG. 3, which shows a variant of the detail A, the insertion region 16' having, in addition to the region 30 which widens conically towards the coupling end face 6 (in accordance with FIGS. 1 and 2), a circular cylindrical segment 32 which extends adjacent thereto and as far as the coupling end face 6. The segment 32 advantageously serves as a polishing reservoir in order to permit an adequate removal of material for the purpose of finishing the coupling end face 6 and the optical fiber end faces ending there.

I claim:

1. A connector for a plurality of optical fibers, comprising:
    a connector body having a plurality of receptacles formed therein each for receiving an end of an optical fiber;
    a coupling end face formed on said connector body at which said receptacles terminate;
    said connector body being formed with a plurality of aligning openings for receiving therein cooperating aligning means at said coupling end face;
    said aligning openings having an insertion region terminating with an edge at said coupling end face, said aligning openings widening towards said edge at said coupling end face such that no contact is formed between said edge and an aligning means inserted into said aligning opening.

2. The connector according to claim 1, wherein said insertion region (16') is formed with a circular cylindrical segment terminating at said coupling end face.

3. The connector according to claim 1, wherein said aligning openings widen conically towards said coupling end face.

* * * * *